A. BROWN.
CLOTH-MEASURING MACHINE.
No. 186,661. Patented Jan. 30, 1877.
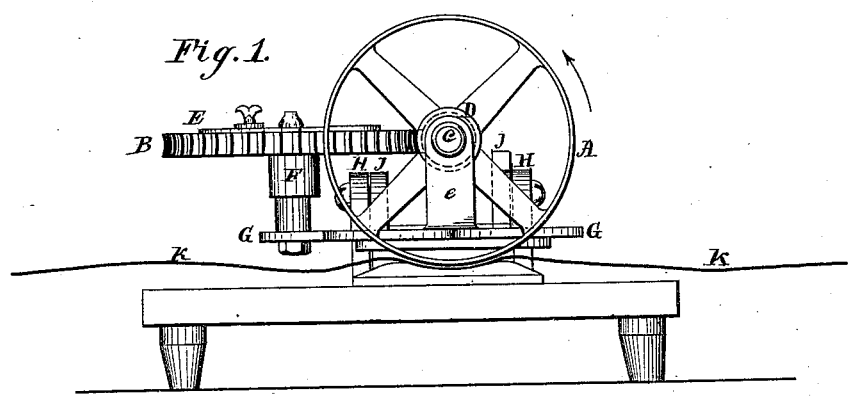
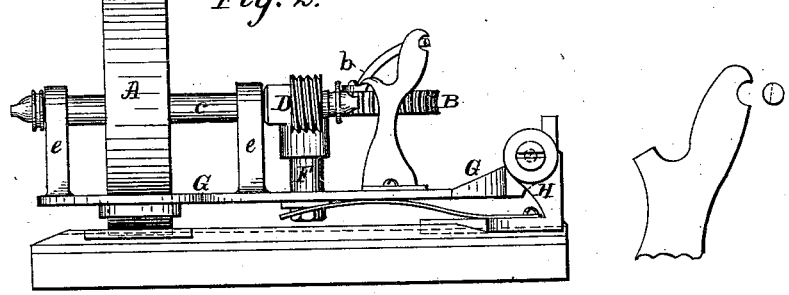
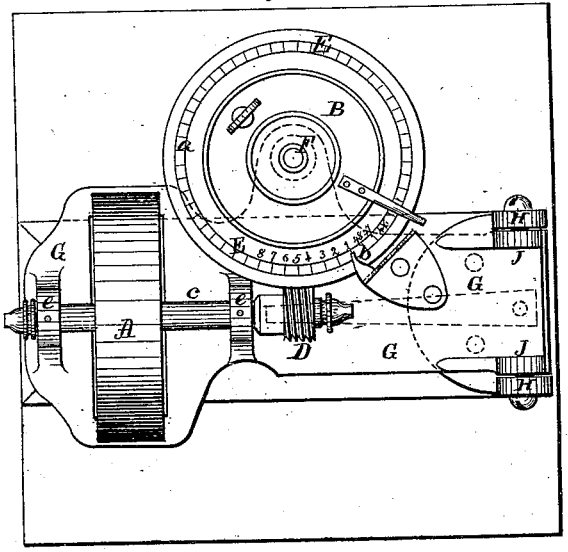
Witnesses:
Wm B Hill.
Geo R Clabaugh
Inventor:
Achra Brown.

UNITED STATES PATENT OFFICE.

ADNA BROWN, OF SPRINGFIELD, VERMONT.

IMPROVEMENT IN CLOTH-MEASURING MACHINES.

Specification forming part of Letters Patent No. 186,661, dated January 30, 1877; application filed November 18, 1876.

*To all whom it may concern:*

Be it known that I, ADNA BROWN, of Springfield, in the county of Windsor, State of Vermont, have invented a new and useful Improvement in Cloth-Measuring Machines, which improvement is fully set forth in the following specification, reference being had to the accompanying drawings.

The object of my invention is to measure cloth accurately and rapidly by means of a cylinder or wheel, A, the horizontal axle or shaft of which is marked $c$, and is supported in position by supports or rests $e$. The outer surface or periphery of the cylinder or wheel is covered with any substance which will produce an even surface, and, at the same time, a surface which will produce a slight friction upon the cloth K to be measured, and upon which the cylinder or wheel A gently presses, so that as the cloth is drawn beneath the cylinder or wheel it will cause the cylinder or wheel to revolve. Upon one end of the axle or shaft $c$ is an endless screw, D, which is geared or connected with cogs or teeth upon the periphery of a horizontal wheel, B, upon which, and connected therewith, is a circular dial-plate, E, said wheel and dial-plate being supported on an upright shaft, F, in such a manner that the wheel A causes the dial-plate to revolve with a proportionate velocity. The upper surface of the dial E is marked off into equal divisions, $a$, so proportioned to the size of the wheel B and the dial E that drawing one yard, or any portion of a yard, of cloth under the wheel A, causing it to revolve with the same velocity with which the cloth is drawn, will cause one of the divisions $a$, or a proportionate part thereof, to pass under the point of an indicator, $b$, attached to the frame G. The divisions are numbered and subdivided.

I do not claim as new, or as of my invention, the dial E and the indicator $b$, or the method of combining the dial E with the shaft.

The bearings or supports $e$, upon which the shaft $c$ revolves, are attached to a simple frame, G, said frame being open under the wheel A, so as to allow it to rest and turn upon the cloth K, which is placed and drawn beneath the frame G and wheel A, the wheel A alone resting upon the cloth, as the periphery of the wheel A extends below the frame G at the opening in the frame G below the wheel A, so that while the frame G, in a measure, supports the wheel A, the cylinder or wheel A at the same time supports one end of the frame G, so that the cloth K, while passing under the cylinder or wheel A, and in contact therewith, (revolving the same,) shall not come in contact with the frame G, or be obstructed thereby.

At the end of the frame G farthest from the cylinder or wheel A it is attached to a small base or platform, H, by means of joints or hinges J, so that the cylinder or wheel A may be easily raised when placing cloth underneath to be measured, and at the same time allowing the cylinder or wheel A and frame to readily assume such positions as various thicknesses of cloth might require.

The base or platform H may or may not be extended underneath the whole frame G and cylinder or wheel A, and may or may not form, as circumstances may render most desirable, a rest or support for the cloth while being measured under the cylinder or wheel A.

This machine may readily be attached to any table, counter, or other support, and the cloth to be measured may be drawn over any plain, smooth surface beneath the cylinder or wheel A; or, in case it should be desirable to increase the friction to insure the movement of the cylinder or wheel A, causing the dial E to move beneath the indicator $b$, the surface over which the cloth K is drawn, at the point where the cylinder or wheel rests, may be slightly concaved, so that as the cloth is drawn along (as it may be by any power desirable for that purpose) more surface of cloth K and friction-power will be applied in moving the cylinder or wheel A.

I claim as my invention—

The combination of a friction cylinder or wheel, substantially as described, revolving upon the upper surface of the cloth K as it is drawn underneath and over the surface of any table, counter, or other proper support, and the frame G, supporting the said friction cylinder or wheel A to the base or platform H by means of joints or hinges J, substantially as and for the purposes set forth.

ADNA BROWN.

Witnesses:
HENRY W. GREENE,
A. M. ALLBE.